United States Patent
Spence

(10) Patent No.: US 6,554,338 B1
(45) Date of Patent: Apr. 29, 2003

(54) GRAB HANDLE

(75) Inventor: William Jason Spence, Greensboro, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 0 days.

(21) Appl. No.: 10/161,262

(22) Filed: Jun. 3, 2002

(51) Int. Cl.$^7$ ................................................ B62D 39/00
(52) U.S. Cl. ...................................... 296/1.1; 16/110.1
(58) Field of Search ........................... 296/1.1, 183, 71, 296/219; 16/110.1, 405, 429, DIG. 12; 280/762, 655; 105/461, 109; D8/315, 316, 317, 326, DIG. 1

(56) References Cited

U.S. PATENT DOCUMENTS

| | | | |
|---|---|---|---|
| 2,282,412 A | | 5/1942 | Wallace |
| 3,523,322 A | | 8/1970 | Rossow |
| 3,633,862 A | | 1/1972 | Breen |
| 4,023,827 A | | 5/1977 | Matalonis et al. |
| 4,266,318 A | | 5/1981 | Dauwalder |
| 4,461,509 A | * | 7/1984 | Yaotani et al. .............. 296/214 |
| 4,871,047 A | * | 10/1989 | McLean ..................... 105/461 |
| 4,895,332 A | | 1/1990 | Hansen et al. |
| D314,130 S | | 1/1991 | Lee |
| 5,025,352 A | | 6/1991 | Brown |
| D327,196 S | | 6/1992 | Crook et al. |
| 5,190,267 A | | 3/1993 | Schmitt et al. |
| 5,285,551 A | | 2/1994 | Weiland et al. |
| 5,386,784 A | | 2/1995 | Meier |
| 5,579,557 A | * | 12/1996 | Boden ......................... 16/429 |
| D380,956 S | | 7/1997 | Collins |
| D388,272 S | | 12/1997 | Moore |
| 5,920,957 A | | 7/1999 | Wagner |
| 5,975,606 A | | 11/1999 | Forbes et al. |
| 6,003,202 A | * | 12/1999 | Dauterive .................... 16/429 |
| 6,106,055 A | | 8/2000 | Fischer |
| 6,202,254 B1 | | 3/2001 | Ezer |
| 6,280,086 B1 | | 8/2001 | Stijns |
| 6,340,189 B1 | * | 1/2002 | Pordy ......................... 296/1.1 |
| 2002/0135205 A1 | * | 9/2002 | Oliver ....................... 296/180.1 |

* cited by examiner

*Primary Examiner*—D. Glenn Dayoan
*Assistant Examiner*—Jason Morrow
(74) *Attorney, Agent, or Firm*—Watts, Hoffmann, Fisher & Heinke Co., L.P.A.

(57) ABSTRACT

A heavy duty truck includes a grab handle for installation on the exterior of the truck to aid operator access to the vehicle. The handle includes an inner and outer tubular member. The inner tubular member has two opposing ends, a closed end formed to define a first truck mating surface and an open end. The outer tubular member has two opposing ends, a closed end formed to define a second truck mating surface and an open end. The inner tubular member is slideably engaged within the outer tubular member such that the inner and outer tubular members are coaxial and define a length of the grab handle. The length is adjustable over a range by sliding the inner tubular member with respect to the outer tubular member. The handle may include an annular shaped seal mounted on the outer tubular member open end to protect an operator's hand.

26 Claims, 2 Drawing Sheets

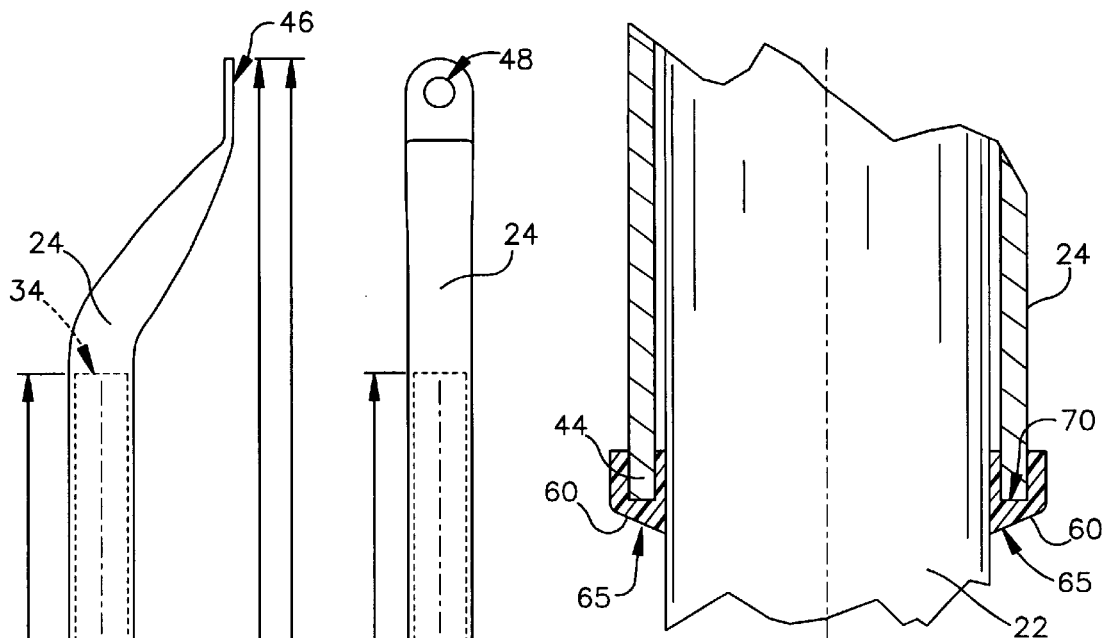
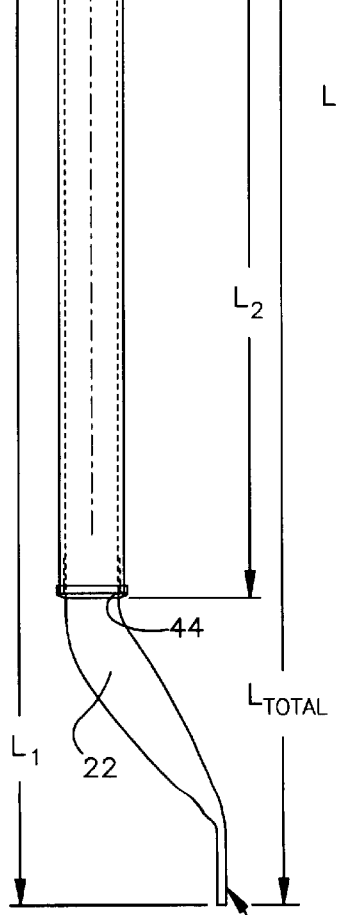
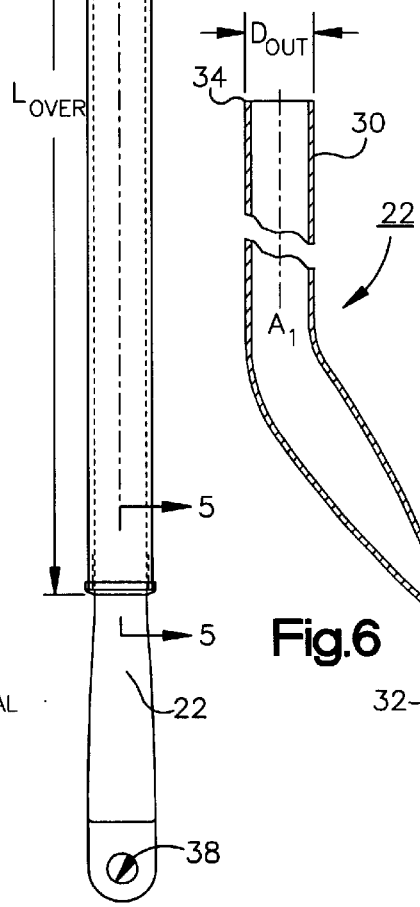
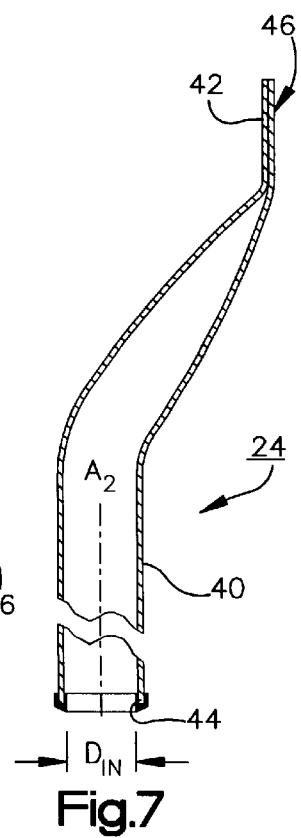

GRAB HANDLE

FIELD OF THE INVENTION

The present invention is directed to a handle and more particularly is directed to an adjustable grab handle for installation on an over-the-highway or heavy duty truck or tractor.

BACKGROUND OF THE INVENTION

Over-the-highway or heavy duty trucks and tractors are relatively large and present a cumbersome structure at rest. An operator of an over-the-highway or heavy duty truck often needs to access exterior areas of the truck. One obvious reason a driver climbs a truck is for cab entry. An operator also commonly needs to access various areas to execute routine safety checks, investigate abnormalities or perform simple maintenance tasks. Frequently, the most economical and timely manner for an operator to access exterior truck areas is to attempt to climb the truck's exterior surface. With this requirement in mind, truck designers commonly include one or more handles to assist a driver when climbing on the truck. Moreover, Federal Motor Vehicle Safety Standards require that a person have at least three points of contact while climbing on or off a vehicle.

Conventionally, grab handles are used on over-the-highway or heavy duty trucks in various locations, and as discussed, are not limited to areas around the driver side door. The grab handles allow easier access and increased safety for an operator. All grab handles must meet federal requirements, such as FMCSR §399.207.

The typical grab handle design is a tube constructed from a commonly used material, e.g., steel, aluminum and plastic. Grab handles are typically manufactured by cutting the material tube to length, bending the opposing ends and machining each end to form mounting holes. Typically, a grab handle is designed and manufactured for a specific application length. Once formed, the grab handle is useable in only one application length.

Original equipment manufacturers typically installed one or more grab handles on each truck. Because of the varying surface design of a truck, it is possible that two or more unique handle designs may be specified for one truck model bill of material. An original equipment manufacturer that builds multiple truck models may be required to inventory dozens of unique grab handle designs.

Grab handles are also typically installed as an after market addition, or as part of a repair following a truck accident. Given the large number of truck manufacturers and different models on the road, an after market outlet or a repair shop may be required to inventory hundreds of grab handle designs. Alternatively, a repair shop may elect to special order low volumes of each handle, but at non-economical pricing. Regardless, the variety of grab handles in use add undesirable expense and complexity to proprietors of after market outlets and repair shops.

A need exists in the market for a relatively inexpensive adjustable grad handle for installation on an over-the-highway or heavy duty truck, providing decreased truck bill of material counts, part costs, and inventory complexity for the original equipment manufacturer, after market, and repair industries.

SUMMARY OF THE INVENTION

The adjustable grab handle of the present invention provides an inexpensive apparatus for installation in a variety of application settings. The handle adjusts to a range of application lengths, reducing the need for multiple grab handles for each application length. The invention is beneficial to original equipment manufacturers as well as after market outlets and repair shops.

In a first embodiment, a heavy duty vehicle has an exterior surface including a plurality of grab handles connected to the surface, the handles for aiding operator access to the exterior and interior of the vehicle, wherein the improvement includes a grab handle including a first and second elongated member.

The first member has a hollow body with two opposing ends. A first end is formed to define a first mating surface and a second end has an outer diameter. The second elongated member has a hollow body with two opposing ends. A first end is formed to define a second mating surface and a second end has an inner diameter. The second member inner diameter is about equal to the first member outer diameter. The first member is slideably engaged within the second member whereby a length of the grab handle is adjustable over a range by sliding the first member with respect to the second member while a portion of the first member is disposed within a portion of the second member.

The grab handle may include an annular shaped seal mounted on the second member second end to protect an operator's hand from the second member second end. The range may be a truck application range from about 635 mm in length to about 720 mm in length.

The length may be fixed after mounting the first mounting surface and second mounting surface to an exterior surface of a heavy duty truck. The grab handle may be adapted to permit rotational movement of the first member with respect to the second member prior to installation on a truck.

In a second embodiment, a heavy duty vehicle having an exterior surface including a plurality of grab handles connected to the surface, the handles for aiding operator access to the exterior of the vehicle, wherein the improvement includes a grab handle including an inner tube and an outer tube.

The inner tube has a longitudinal axis and two opposing ends. A closed end is formed to define a first mating surface and an open end has an outer diameter. The outer tube has a longitudinal axis and two opposing ends. A closed end is formed to define a second mating surface and an open end has an inner diameter. The inner tube slideably engages the outer tube such that the inner tube and outer tube are coaxial and define an overall length of the grab handle. The length is adjustable over a range by sliding the inner tube open end with respect to the outer tube open end.

The grab handle of the second embodiment may include an annular shaped seal mounted on the outer tube open end to protect an operator's hand from the second member open end. The range may be a truck application range from about 635 mm in length to about 720 mm in length.

The length may be fixed after mounting each of the first and second mounting surfaces to an exterior surface of a heavy duty truck. The grab handle may be adapted to permit rotational movement of the inner tube with respect to the outer tube prior to installation of the grab handle on a truck.

In a third embodiment, a grab handle apparatus, for installation on an exterior surface of a heavy duty truck to aid operator access to the exterior of the vehicle, includes an inner tubular member, an outer tubular member and an annular shaped seal.

The inner tubular member has two opposing ends. A closed end is formed to define a first truck mating surface.

The outer tubular member has two opposing ends. A closed end forms to define a second truck mating surface. The inner tubular member is slideably engaged within the outer tubular member such that the inner and outer tubular members are coaxial and define a length of the grab handle. The length is adjustable over a range by sliding the inner tubular member with respect to the outer tubular member. The annular shaped seal is mounted on the outer tubular member open end to protect an operator's hand from the outer tubular member open end.

The range may be a truck application range from about 635 mm in length to about 720 mm in length. The grab handle may be adapted to permit rotational movement of the inner tubular member with respect to the outer tubular member prior to installation on a truck. The annular shaped seal may include a polymer-based material.

Further advantages and a fuller understanding of the invention will be had from the accompanying drawings and the detailed description of the invention.

BRIEF DESCRIPTION OF THE DRAWINGS

FIG. 3 is a side view of the grab handle apparatus of FIG. 2;

FIG. 4 is a top view of the grab handle apparatus of FIG. 2;

FIG. 5 is an exploded partial sectional view of the grab handle apparatus of FIG. 2 as seen from a plane indicated by the line 5—5 in FIG. 4;

FIG. 6 is fragmentary sectional view of a first tube member of the grab handle apparatus of FIG. 2; and FIG. 7 is fragmentary sectional view of a second tube member of the grab handle apparatus of FIG. 2.

DETAILED DESCRIPTION OF THE PREFERRED EMBODIMENT

Figure 1:
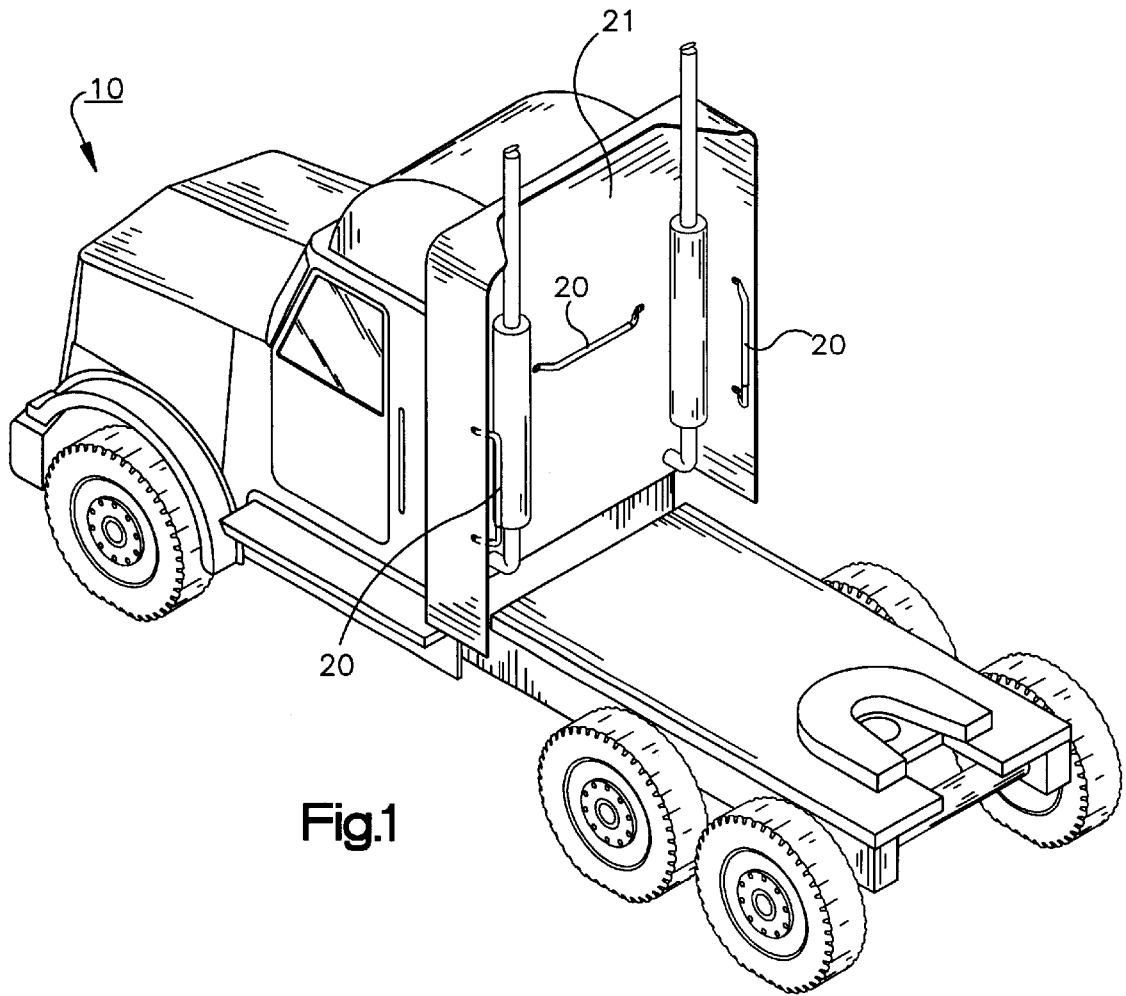
FIG. 1 is a perspective view of an over-the-highway tractor having a plurality of grab handles, each constructed in accordance with the preferred embodiment the present invention.

Referring now to the drawings, FIG. 1 is a perspective view of an over-the-highway truck 10 having a plurality of grab handle apparatus 20. As illustrated, the over-the-highway vehicle is a tractor 10 designed to pull an elongated trailer. The grab handles 20 as shown are installed in three locations on the exterior surface 21 of the truck 10. The handles 20 are placed at advantageous positions for aiding truck operator access to the exterior 21 of the vehicle. Each handle 20 is adjustable to install over a range of application lengths.

Figure 2:
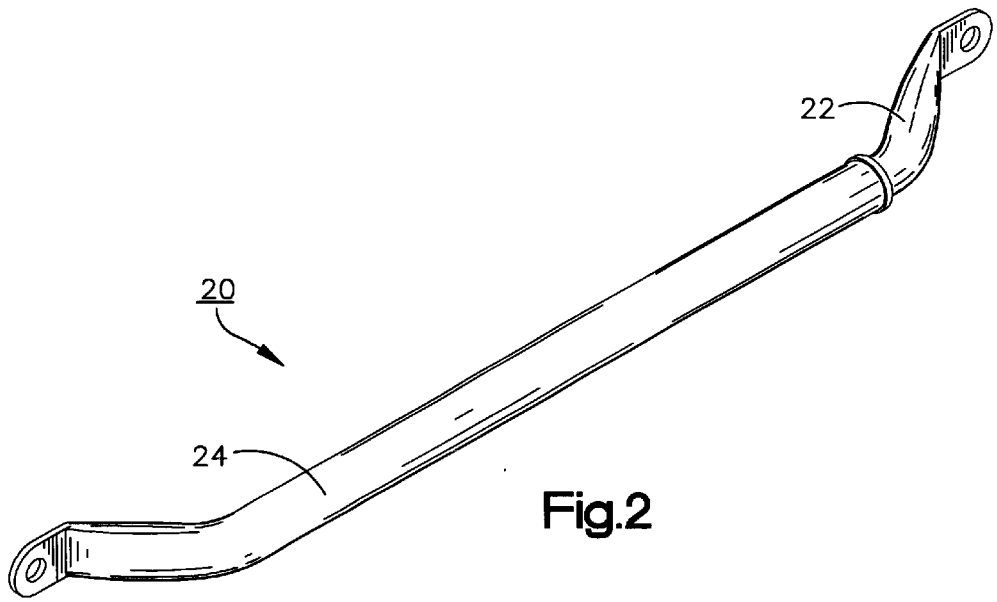
FIG. 2 is a perspective view of a grab handle apparatus constructed in accordance with the preferred embodiment the present invention.

Referring now to FIG. 2, a perspective view of a grab handle 20 constructed in accordance with a preferred embodiment the present invention is illustrated. As stated, the grab handle 20 may be installed on the exterior of a heavy duty truck for aiding operator access to the exterior of the vehicle. As illustrated, the grab handle 20 includes a first elongated member 22 and a second elongated member 24.

As best shown in FIG. 6, the first elongated member 22 has a hollow body 30 with two opposing ends 32, 34. The first elongated member 22 may be formed from a metallic tube, such as stainless steel or aluminum. In the preferred embodiment, the metallic tube has a bright polished finish, which may be aesthetically pleasing. It should be apparent to others with ordinary skill in the art that other materials of sufficient strength, such as plastics, could be utilized in the practice of the present invention. Likewise, other cross-sectional shapes, e.g., square, may be used in the practice of the present invention.

Referring again to FIG. 6, a fragmentary sectional view of a first elongated member 22 of the grab handle 20 of FIG. 2 is illustrated. A first end 32 is formed to define a first mating surface 36. In the preferred embodiment, the first end 32 is formed from a metallic tube by crimping the circular-shaped end until the interior surface of the tube forms two contacting surfaces. After the crimping operation, the first end 32 includes a first mating surface 36. The first mating surface 36 is relatively flat and uniform for mating to a truck surface. A first end mating hole 38 is then machined into the first end 32, as best seen in FIG. 4. Conventional hardware, such as a rivet or screw, is then inserted into the mating hole 38 to secure the grab handle 20 to the vehicle 10.

Still referring to FIG. 6, a second end 34 of the first elongated member 22 is illustrated. The second end 34 defines an outer diameter Dou of the first elongated member 22. In the preferred embodiment, the second end 34 is formed by cutting a metallic tube to a desired length. In one embodiment, the length $L_1$ of the first elongated member 22 is about 310 mm. The second end 34 must be sufficiently smooth and free of burrs such that it may be slideably inserted within a slightly larger tube 24.

The second elongated member 24 is illustrated in FIG. 7. As illustrated, the second elongated member 24 has a hollow body 40 with two opposing ends 42, 44. Similar to the first elongated member 22, the second elongated member 24 may be formed from a metallic tube, such as stainless steel, aluminum, plastic or any other material of sufficient strength.

Referring again to FIG. 7, a fragmentary sectional view of a second elongated member 24 of the grab handle 20 of FIG. 2 is illustrated. A first end 42 is formed to define a second mating surface 46. In the preferred embodiment, the first end 42 is formed from a metallic tube by crimping the circular-shaped end together. After the crimping operation, the first end 42 includes a second mating surface 46. Similar to the first mating surface 36, the second mating surface 46 is relatively flat and uniform. A first end mating hole 48 is machined into the first end 42, as best seen in FIG. 4. The mating hole 48 may be used with hardware as a mounting means to secure the grab handle 20 to a vehicle 10.

A second end 44 of the second elongated member 24 is also illustrated in FIG. 7. The second end 44 defines an inner diameter $D_{IN}$ of the second elongated member 22. As illustrated in FIGS. 4 and 5, the second member inner diameter $D_{IN}$ is about equal to the first member outer diameter $D_{OUT}$. The inner diameter $D_{IN}$ and outer diameter $D_{OUT}$ should be of a size and tolerance to allow relative movement of the first member with respect to the second member with minimal interference. In the preferred embodiment, the second end 44 is formed by cutting a metallic tube to a desired length. In one embodiment, the length $L_2$ of the second elongated member 24 is about 510 mm. The second end 44 must be sufficiently smooth and free of burrs such that it accepts the second end 34 of the first elongated member 22 as it is slideably inserted within the second elongated member 24.

FIG. 3 is a side view and FIG. 4 is a top view of the grab handle apparatus of FIG. 2, showing the assembled grab handle. As illustrated in FIGS. 2, 3 and 4, the first elongated member 22 is slideably engaged within the second elongated member 24 with minimal interference. The engagement is such that an overall length of the grab handle is adjustable over a range. The application length is adjusted by sliding the first member 22 second end 34 with respect to said second member 24 second end 44. As illustrated, a portion of the first member 22 is disposed within a portion of the second member 24.

As discussed, the total length $L_{TOTAL}$ of the grab handle is adjustable over an a application range. In the preferred embodiment, the truck application range is from about 635 mm in length to about 720 mm in length. As the first member 22 second end 34 moves a greater distance from the second member 24 second end 44, the total length $L_{TOTAL}$ of the grab handle decreases. Alternatively, the total length $L_{TOTAL}$ of the grab handle increases as the 22 second end 34 moves a lesser distance from the second end 44.

A handle overlap length is defined by a length $L_{OVER}$ where the first and second elongated members are common and overlap. As the handle length $L_{TOTAL}$ decreases, the handle length $L_{OVER}$ of overlap increases. When constructing the grab handle and determining the length $L_1$ of the first elongated member and the length $L_2$ of the second elongated member, a sufficient minimum length $L_{OVER}$ of overlap must be included to provide the handle adequate strength. It is believed a handle within inadequate overlap will bend and otherwise deform during use. In the preferred embodiment, length $L_{OVER}$ of overlap can be adjusted from about 100 mm to about 185 mm. While not wanting to be bound by theory, the required minimum overlap length $L_{OVER}$ is believed to be a function of the material utilized in constructing the handle.

As illustrated in FIG. 1, the application length $L_{TOTAL}$ is adjustable only prior to use. The application length $L_{TOTAL}$ is fixed after mounting the first and second mounting surfaces 36, 46 to an exterior surface 21 of a heavy duty truck 10. However, in some cases, the handle 20 may be removed and reused at a different application length, depending on the handle condition and application history. Regardless, it should be understood by others with ordinary skill in the art that the total length $L_{TOTAL}$ and overlap length $L_{OVER}$ stated are for exemplary purposes, and the total length $L_{TOTAL}$ and overlap length $L_{OVER}$ may be shortened or lengthened in the practice of the present invention.

The preferred embodiment of the grab handle includes yet another advantageous application feature. The grab handle 20 is adapted to permit rotational movement of the first elongated member 22 with respect to the second elongated member 24 prior to installation on a truck 10. After the first elongated member 22 is insertably engaged within the second elongated member 24, an installer may rotate the two members 22, 24 by hand with respect to each other. If the grab handle is to be installed on a flat uniform surface, the first mating surface 36 and the second mating surface 46 can be rotated into a coplanar position about a center axis common to each member. Alternatively, if the application field is irregular, the first mating surface 36 and the second mating surface 46 can be rotated into separate positions that are not coplanar. This advantageous feature allows for installation in multiple application lengths, as well as multiple application surfaces.

Referring again to FIGS. 6 and 7, the preferred embodiment of the present invention includes an inner tube 22 having a longitudinal axis $A_1$ and an outer tube 24 having a longitudinal axis $A_2$. As illustrated, the inner tube 22 slideably engages the outer tube 24 such that the inner tube 22 and outer tube 24 are coaxial $A_1$, $A_2$.

Referring now to FIG. 5, an exploded partial sectional view of the grab handle apparatus of FIG. 2 is illustrated, as seen from a plane indicated by the line 5—5 in FIG. 4. When installing the handle, or while in use, an operator's hand frequently contacts a center region of the handle which includes the second member 24 second end 44. This end 44 may have sharp edges from the machining operations. The handle illustrated includes an annular shaped seal 60. The seal 60 is mounted on the second member 24 second end 44. The seal 60 encases the second end 44. The annular shaped seal 60 may be constructed from a polymer-based material.

The exposed surface 65 of the seal is relatively smooth to protect an operator's hand from any burrs or machining irregularities on the exterior surface 70 of the second member 24 second end 44. Further, the seal may act to preserve the first and second elongated members. Specifically, the seal may prohibit dirt, moisture, or other types of fluids from seeping between the outer circumference of the first elongated member and the inner surface of the second member. In one embodiment, the seal 60 may provide a hermetic seal. Alternatively, the seal may be essentially water tight.

The preferred embodiments of the invention have been illustrated and are described in detail. However, the present invention is not to be considered limited to the precise construction disclosed. Various adaptations, modifications and uses of the invention may occur to those skilled in the art to which the invention relates and the intention is to cover hereby all such adaptations, modifications and uses which fall within the spirit or scope of the appended claims.

What is claimed is:

1. In a heavy duty vehicle having an exterior surface including at least one grab handle connected to said surface, said at least one handle for aiding operator access to the exterior of the vehicle, the improved grab handle comprising:
   a) a first elongated member having a hollow body with two opposing ends, a first end formed to define a first mating surface and a second end having an outer diameter;
   b) a second elongated member having a hollow body with two opposing ends, a first end formed to define a second mating surface and a second end having an inner diameter, wherein said second member inner diameter is about equal to said first member outer diameter;
   c) wherein said first member is slideably engaged within said second member whereby a length of said grab handle is adjustable over a range by sliding said first member second end with respect to said second member second end, wherein a portion of the first member is disposed within a portion of the second member; and
   d) an annular shaped seal mounted on the second member second end, wherein an exposed surface of said seal is adapted to protect an operator's hand from the second member second end.

2. The heavy duty vehicle of claim 1 wherein said range is a truck application range from about 635 mm in length to about 720 mm in length.

3. The heavy duty vehicle of claim 1 wherein said length is fixed after mounting each of said first and second mounting surfaces to an exterior surface of a heavy duty truck.

4. The heavy duty vehicle of claim 1 wherein said grab handle is adapted to permit rotational movement of said first member with respect to said second member prior to installation on a truck.

5. In a heavy duty vehicle having an exterior surface including at least one grab handle connected to said surface, said at least one handle for aiding operator access to the exterior of the vehicle, the improved grab handle comprising:

a) an inner tube having a longitudinal axis and two opposing ends, a closed end formed to define a first mating surface and an open end having an outer diameter;

b) an outer tube having a longitudinal axis and two opposing ends, a closed end formed to define a second mating surface and a open end having an inner diameter;

c) wherein said inner tube slideably engages said outer tube such that said inner tube and outer tube are coaxial and define an overall length of said grab handle, said length adjustable over a range by sliding said inner tube open end with respect to said outer tube open end; and d) an annular shaped seal mounted on the outer tube open end, wherein an exposed surface of said seal is adapted to protect an operator's hand from the outer tube open end.

6. The heavy duty vehicle of claim 5 wherein said range is a truck application range from about 635 mm in length to about 720 mm in length.

7. The heavy duty vehicle of claim 5 wherein said length is fixed after mounting each of said first and second mounting surfaces to an exterior surface of a heavy duty truck.

8. The heavy duty vehicle of claim 5 wherein said grab handle is adapted to permit rotational movement of said inner tube with respect to said outer tube prior to installation of the grab handle on a truck.

9. A grab handle apparatus for installation on an exterior surface of a heavy duty truck or tractor to aid operator access to the exterior of the vehicle, the apparatus comprising:

a) an inner tubular member having two opposing ends, a closed end formed to define a first truck mating surface and an open end; and b) an outer tubular member having two opposing ends, a closed end formed to define a second truck mating surface and an open end;

c) wherein said inner tubular-member open end is slideably engaged within said outer tubular member open end such that said inner and outer tubular members are coaxial and define a length of said grab handle, said length adjustable over a range by sliding said inner tubular member with respect to said outer tubular member; and d) an annular shaped seal mounted on the outer tubular member open end, wherein an exposed surface of said seal is adapted to protect an operator's hand from the outer tubular member open end.

10. The apparatus of claim 9 wherein said range is a truck application range from about 635 mm in length to about 720 mm in length.

11. The apparatus of claim 9 wherein said grab handle is adapted to permit rotational movement of said inner tubular member with respect to said outer tubular member prior to installation on a truck.

12. The apparatus of claim 9 wherein said annular shaped seal comprises a polymer-based material.

13. A grab handle apparatus for installation on an exterior surface of a heavy duty truck or tractor to aid operator access to the exterior of the vehicle, the apparatus comprising:

a) a first and second elongated member, each member having a first end portion adapted for being connected to said exterior surface and a second end portion;

b) wherein said second end portion of said first member has an outer cross-sectional shape cooperatively corresponding to an inner cross-sectional shape of said second end portion of said second member for being slideably engaged within said second member; and c) an annular shaped seal mounted on the second end portion of the second member, said seal for protecting an operator's hand from the second member second end.

14. The apparatus of claim 13 wherein said first elongated member has a tubular shape.

15. The apparatus of claim 13 wherein said second elongated member has a tubular shape.

16. The apparatus of claim 13 wherein the second end portion of the first elongated member has an outer circular cross-sectional shape.

17. The apparatus of claim 13 wherein the second end portion of the second elongated member has an inner circular cross-sectional shape.

18. The apparatus of claim 13 wherein the first end portion of the first elongated member is closed, wherein said first end portion forms a flat connection surface.

19. The apparatus of claim 13 wherein the first end portion of the second elongated member is closed, wherein said first end portion forms a flat connection surface.

20. In a heavy duty vehicle having an exterior surface including at least one grab handle apparatus connected to said surface, said at least one apparatus for aiding operator access to the exterior of the vehicle, the improved grab handle apparatus comprising:

a) a first and second elongated member, each member having a first end portion adapted for being connected to said exterior surface and a second end portion;

b) wherein said second end portion of said first member has an outer cross-sectional shape cooperatively corresponding to an inner cross-sectional shape of said second end portion of said second member for being slideably engaged within said second member; and c) an annular shaped seal mounted on the second end portion of the second member, said seal for protecting an operator's hand from the second member second end.

21. The apparatus of claim 20 wherein said first elongated member has a tubular shape.

22. The apparatus of claim 20 wherein said second elongated member has a tubular shape.

23. The apparatus of claim 20 wherein the second end portion of the first elongated member has an outer circular cross-sectional shape.

24. The apparatus of claim 20 wherein the second end portion of the second elongated member has an inner circular cross-sectional shape.

25. The apparatus of claim 20 wherein the first end portion of the first elongated member is closed, wherein said first end portion forms a flat connection surface.

26. The apparatus of claim 20 wherein the first end portion of the second elongated member is closed, wherein said first end portion forms a flat connection surface.

* * * * *